(12) United States Patent
Baba (10) Patent No.: US 7,717,440 B1
(45) Date of Patent: May 18, 2010

(54) ADAPTABLE LUGGAGE CART FOR TRANSPORTING ITEMS BETWEEN REMOTE LOCATIONS

(76) Inventor: Ahmad Baba, 658 Ray Ave., Ridgefield, NJ (US) 07657

( * ) Notice: Subject to any disclaimer, the term of this patent is extended or adjusted under 35 U.S.C. 154(b) by 236 days.

(21) Appl. No.: 11/974,438

(22) Filed: Oct. 12, 2007

(51) Int. Cl.
*B62B 3/00* (2006.01)

(52) U.S. Cl. .............................. 280/47.371; 280/47.34; 280/47.17; 280/47.315; 280/43; 280/43.1

(58) Field of Classification Search ............... 190/15.1; 280/43, 43.1, 43.12, 43.17, 43.21, 646, 47.34, 280/47.371, 47.131, 47.17, 47.16, 47.24, 280/47.26, 47.315
See application file for complete search history.

(56) References Cited

U.S. PATENT DOCUMENTS

| | | | |
|---|---|---|---|
| 854,602 A * | 5/1907 | Peterson | 280/43.1 |
| 2,510,754 A * | 6/1950 | Norlin | 280/38 |
| 2,577,290 A * | 12/1951 | Underwood | 280/646 |
| 2,581,417 A * | 1/1952 | Jones | 280/645 |
| 3,014,733 A * | 12/1961 | Higginbotham | 280/43.1 |
| 3,057,636 A * | 10/1962 | D Ettorre et al. | 280/37 |
| 3,178,197 A * | 4/1965 | Boatner | 280/37 |
| 3,298,705 A * | 1/1967 | Neaverson et al. | 280/46 |
| 3,917,038 A * | 11/1975 | Foge et al. | 190/18 A |
| 3,946,839 A * | 3/1976 | Butler | 190/18 A |
| RE28,757 E * | 4/1976 | Cassimally | 280/37 |
| 4,254,850 A * | 3/1981 | Knowles | 190/18 A |
| 4,273,222 A * | 6/1981 | Cassimally et al. | 190/18 A |
| 4,771,871 A * | 9/1988 | Lambracht | 190/1 |
| 4,852,705 A * | 8/1989 | Cowan, Jr. | 190/18 A |
| 4,915,402 A * | 4/1990 | Brinker | 280/37 |
| 4,979,598 A * | 12/1990 | Verheij et al. | 190/18 A |
| 5,114,164 A * | 5/1992 | Bothwell et al. | 280/37 |
| 5,154,265 A * | 10/1992 | Capistrant | 190/18 A |
| 5,232,232 A * | 8/1993 | Kishi | 280/43.1 |
| 5,313,817 A * | 5/1994 | Meinders | 62/457.1 |
| 5,407,039 A * | 4/1995 | Alper et al. | 190/18 A |
| 5,464,081 A * | 11/1995 | Zwanzig | 190/115 |
| 5,480,178 A * | 1/1996 | Suk | 280/646 |
| 5,484,046 A * | 1/1996 | Alper et al. | 190/115 |
| 5,628,522 A * | 5/1997 | Hall | 280/43.17 |
| 5,713,439 A * | 2/1998 | Zionts et al. | 190/102 |
| 5,778,488 A * | 7/1998 | Tsai | 16/34 |
| 6,041,900 A * | 3/2000 | Sadow et al. | 190/18 A |
| 6,073,737 A * | 6/2000 | Kang | 190/18 A |
| 6,179,176 B1 * | 1/2001 | Saggese et al. | 224/153 |
| 6,193,033 B1 * | 2/2001 | Sadow et al. | 190/18 A |
| 6,612,411 B2 * | 9/2003 | Nykoluk et al. | 190/18 A |
| 7,051,853 B2 * | 5/2006 | Brown | 190/18 A |
| 7,066,311 B2 * | 6/2006 | O'Shea | 190/18 A |
| 7,070,190 B2 * | 7/2006 | Sadow | 280/37 |
| 7,462,009 B2 * | 12/2008 | Hartmann et al. | 414/434 |

(Continued)

*Primary Examiner*—Glenn Dayoan
*Assistant Examiner*—Vaughn T Coolman (57) ABSTRACT

A manually operable luggage cart includes a central and unitary storage chamber with planar top and bottom surfaces. The assembly further includes a handle that is pivotal between rectilinear oblong displaced positions extending parallel and diagonal to a longitudinal length of the storage chamber, a plurality of casters rotatably connected to the storage chamber, and a mechanism for automatically biasing the casters between exposed and retracted positions from the bottom surface of the storage chamber when the handle is pivoted between the parallel and diagonal positions and about a curvilinear path defined adjacent to the proximal end of the storage chamber. The adaptable luggage cart further includes a plurality of straps.

6 Claims, 5 Drawing Sheets

U.S. PATENT DOCUMENTS

| | | | |
|---|---|---|---|
| 7,503,439 B2 * | 3/2009 | O'Shea et al. | 190/18 A |
| 2004/0000457 A1 * | 1/2004 | Sanford-Schwentke | 190/18 A |
| 2004/0026882 A1 * | 2/2004 | Brown | 280/47.34 |
| 2006/0175170 A1 * | 8/2006 | Brown | 190/8 |
| 2006/0192356 A1 * | 8/2006 | Coates | 280/43.17 |
| 2008/0116026 A1 * | 5/2008 | Bass et al. | 190/1 |

* cited by examiner

ADAPTABLE LUGGAGE CART FOR TRANSPORTING ITEMS BETWEEN REMOTE LOCATIONS

CROSS REFERENCE TO RELATED APPLICATIONS

This application claims the benefit of U.S. Provisional Application No. 60/849,184, filed Oct. 4, 2006, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to luggage carts and, more particularly, to an adaptable luggage cart for transporting goods between remote locations.

2. Prior Art

Everyday, countless consumers climb into automobiles, buses and airplanes and embark on business trips and family vacations. Whether traveling across state lines in order to visit a favorite relative, trekking across country for a relaxing stay at a beach front resort, or climbing aboard a 747 for an important business meeting, spending time away from home is a fact of life for millions of people. Regardless if one travels for business or pleasure, most consumers do not leave home without first packing personal belongings necessary for the trip. Changes of clothing, shoes, toiletries, hair dryers and personal mementos are but a few of the many items most people pack into a suitcase and take with them on the road.

While packing a suitcase for travel is necessary, actually transporting packed luggage can be a difficult task. For those who utilize traditional, handled suitcases and travel bags, transporting these goods involves the burden of balancing the entire weight of the bag on one arm or shoulder. Straining the muscles of the neck and back, carrying a packed suitcase can be an exhausting endeavor, particularly for elderly persons and those who are not in the best physical shape. Although luggage manufactures have recently begun adding two wheels to the design of many suitcases in order to facilitate transport, transporting several bags at once can be problematic.

Simply stated, most consumers find that they must carry more than one suitcase or travel bag with them when they travel, simply in order to make room for such necessities as toiletries, extra shoes, hairdryers, curling irons and similar goods. In addition, for those traveling with small children, items such as car seats, portable cribs and similar infant accessories are absolute necessities which must be manually carried when transporting items through an airport, train station, or even from one's vehicle to a hotel room. Obviously, it would be advantageous to provide a more practical means of transporting the many items needed during travel.

U.S. Pat. No. 7,219,904 to Boom discloses a luggage cart assembly including a base that has a top side, a bottom side, a first end edge, a second end edge, a first lateral edge and a second lateral edge. A plurality of wheels is rotatably coupled to the bottom side. The top side has a plurality of wells extending therein. Each of the first and second side edges have two wells positioned adjacent thereto. A plurality of posts each has a first end and a second end and a bend positioned between the first and second ends. Each of the first ends is positionable into one of the wells such that second ends of adjacent posts extend toward each other. A pair of fastening members removably secures adjacent ones of the second ends together. A rod has a pair of opposite ends. Each of the opposite ends is removably attached to one of the fastening members. Unfortunately, this prior art example does not incorporate a storage chamber.

U.S. Pat. No. 7,140,635 to Johnson discloses a frame assembly, two wheel holding carriers which are arcuately pivotably mounted to the frame assembly, and a support platform which is also pivotally mounted to the frame assembly and controls the movement of the wheel holding carrier. A small, compact, two wheeled, luggage cart/carrier is achieved which is capable of quickly and easily arcuately pivoting wheel support brackets between two alternate positions, with ease and convenience. In addition, the arcuate pivoting movement of the wheel supporting brackets is automatically achieved simultaneously with movement of the luggage support platform from a stowed position to a deployed, usable position. The support platform is pivotally mounted to the terminating end of the frame assembly for being arcuately pivoted between a first, stowed position and a second, deployed position wherein the support platform is substantially perpendicular to the plane established by the frame assembly. Unfortunately, this prior art example does not incorporate a storage chamber.

U.S. Pat. No. 6,367,602 to Chang discloses a retractable wheel for a built-in luggage cart with a pair of telescopic pull rods, a handle mounted on the upper ends of the pull rods and retractable wheels provided at opposite sides of the lower edge of the luggage near the lower ends of the pull rods. The retractable wheel has a frame attached to the luggage and defined with a wheel well, a retractable wheel mount having an upper end pivotally connected to the frame, and a wheel rotatably attached to the lower end of the wheel mount, a strut vertically movable in the frame, a pair of arms having one end thereof pivotally connected to the strut and the other end thereof pivotally connected to the wheel mount, thereby the retractable wheel is extendable and retractable when the pull rods of the built-in luggage cart are extended and retracted. Unfortunately, this prior art example does not include straps for securing additional luggage to the cart.

Accordingly, the present invention is disclosed in order to overcome the above noted shortcomings. The present invention satisfies such a need by providing an assembly that is convenient and easy to use, lightweight yet durable in design, and designed for transporting goods between remote locations. The adaptable luggage cart is simple to use, inexpensive, and designed for many years of repeated use.

BRIEF SUMMARY OF THE INVENTION

In view of the foregoing background, it is therefore an object of the present invention to provide an apparatus for transporting goods between remote locations. These and other objects, features, and advantages of the invention are provided by an adaptable luggage cart.

A manually operable luggage cart includes a central and unitary storage chamber with planar top and bottom surfaces. The device further includes a handle that is effectively pivotal between rectilinear oblong displaced positions extending parallel and diagonal to a longitudinal length of the storage chamber. Such a handle includes a pair of tubular female members situated against the bottom surface of the storage chamber and extending parallel to a longitudinal length thereof, and a pair of tubular male members telescopically seated within the female members and longitudinally displaced between linearly extended and retracted positions respectively. Such male members are completely removable from the female members when fully displaced to the extended position such that the male members are conveniently pivoted between clockwise and counter clockwise positions such that the male members are selectively adapted between the parallel and diagonal positions as the luggage cart is raised and lowered about a distal end of the storage chamber.

The assembly further includes a plurality of casters rotatably connected to the storage chamber, and a mechanism for automatically biasing the casters between exposed and retracted positions from the bottom surface of the storage chamber when the handle is pivoted between the parallel and diagonal positions and about a curvilinear path defined adjacent to the proximal end of the storage chamber. Such an automatic biasing mechanism is advantageously partially housed within the storage chamber and includes at least one rectilinear shaft directly coupled to at least one of the casters. Such a rectilinear shaft has a geared front face extending along a major longitudinal length thereof.

The automatic biasing mechanism further includes a drive gear directly connected to the handle and rotated along clockwise and counter clockwise directions when the handle is pivoted between the parallel and diagonal positions respectively. A first driven gear is in direct and rotary engagement with such a drive gear, and such a first driven gear is freely rotated in an opposite arcuate path with respect to the drive gear and further is housed within the storage chamber. A second driven gear is effectively in direct and rotary engagement with the first driven gear and the rectilinear shaft respectively. Such a second driven gear is rotated in a same direction as the drive gear. The second driven gear causes the rectilinear shaft to reciprocate along a rectilinear path while the drive gear is rotated along the clockwise and counter clockwise directions when the handle is pivoted between the parallel and diagonal positions respectively.

The first driven gear is intermediately disposed between the second driven gear and the drive gear, and the drive gear is conveniently situated adjacent to a proximal end of the luggage cart and partially exposed from the bottom surface of the storage chamber for allowing the male members to freely rotate along a travel path defined exterior of the storage chamber. The first driven gear is spaced from the rectilinear shaft and the male members respectively.

The adaptable luggage cart further includes a plurality of straps with opposed ends directly mated to longitudinal sides of the storage chamber. Such straps advantageously traverse across the top surface of the storage chamber for securing the goods on top of the top surface of the storage chamber.

A method for utilizing a manually operable luggage cart to transport goods between remote locations includes the steps of: providing a central and unitary storage chamber with planar top and bottom surfaces; connecting a handle to the storage chamber in such a manner that the handle is pivotal between rectilinear and oblong displaced positions extending parallel and diagonal to a longitudinal length of the storage chamber; rotatably connecting a plurality of casters to the storage chamber; and automatically biasing the casters between exposed and retracted positions from the bottom surface of the storage chamber when the handle is pivoted between the parallel and diagonal positions and about a curvilinear path defined adjacent to the proximal end of the storage chamber.

The method further includes the step of: directly mating a plurality of straps to longitudinal sides of the storage chamber by traversing the straps across the top surface of the storage chamber for securing the goods on top of the top surface of the storage chamber.

The method further includes the steps of: directly coupling at least one rectilinear shaft to at least one of the casters by extending a geared front face of the rectilinear shaft along a major longitudinal length thereof; directly connecting a drive gear to the handle; rotating the drive gear along clockwise and counter clockwise directions when the handle is pivoted between the parallel and diagonal positions respectively; directly and rotatably engaging a first driven gear with the drive gear; freely rotating the first driven gear in an opposite arcuate path with respect to the drive gear; directly and rotatably engaging a second driven gear with the first driven gear and the rectilinear shaft respectively; rotating the second driven gear in a same direction as the drive gear; and the second driven gear causing the rectilinear shaft to reciprocate along a rectilinear path while the drive gear is rotated along the clockwise and counter clockwise directions when the handle is pivoted between the parallel and diagonal positions respectively.

The method further includes the steps of: situating a pair of tubular female members against the bottom surface of the storage chamber by extending the female members parallel to a longitudinal length thereof; telescopically seating a pair of tubular male members within the female members by longitudinally displacing the male members between linearly extended and retracted positions respectively; completely removing the male members from the female members by fully displacing the male members to the extended position; and pivoting the male members between clockwise and counter clockwise positions such that the male members are selectively adapted between the parallel and diagonal positions as the luggage cart is raised and lowered between about a distal end of the storage chamber.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The assembly of this invention is referred to generally in FIGS. 1-7 by the reference numeral 10 and is intended to protect an adaptable luggage cart. It should be understood that the assembly 10 may be used to adapt many different types of storage chambers and should not be limited in use with only the types of storage chambers mentioned herein.

Referring initially to FIGS. 1, 2, 3 and 4, a manually operable luggage cart 10 includes a central and unitary storage chamber 20 with planar top and bottom surfaces 21, 22. The assembly 10 further includes a handle 23 that is pivotal between rectilinear oblong displaced positions extending parallel and diagonal to a longitudinal length of the storage chamber 20. Such a handle 23 includes a pair of tubular female members 24 situated against the bottom surface 22 of the storage chamber 20 and extending parallel to a longitudinal length thereof, and a pair of tubular male members 25 telescopically seated within the female members 24 and longitudinal displaced between linearly extended and retracted positions respectively. Such male members 25 are completely removable from the female members 24 when fully displaced to the extended position which is essential such that the male members 25 are pivoted between clockwise and counter clockwise positions which is important such that the male members 25 are selectively adapted between the parallel and diagonal positions as the luggage cart 10 is raised and lowered about a distal end 28 of the storage chamber 20. The male and female members 25, 24 of the handle 23 may be adapted inward for easy storage, outward and parallel for easy maneuverability of the suitcase, or diagonal for activation of the automatic biasing mechanism 27.

Figure 5:
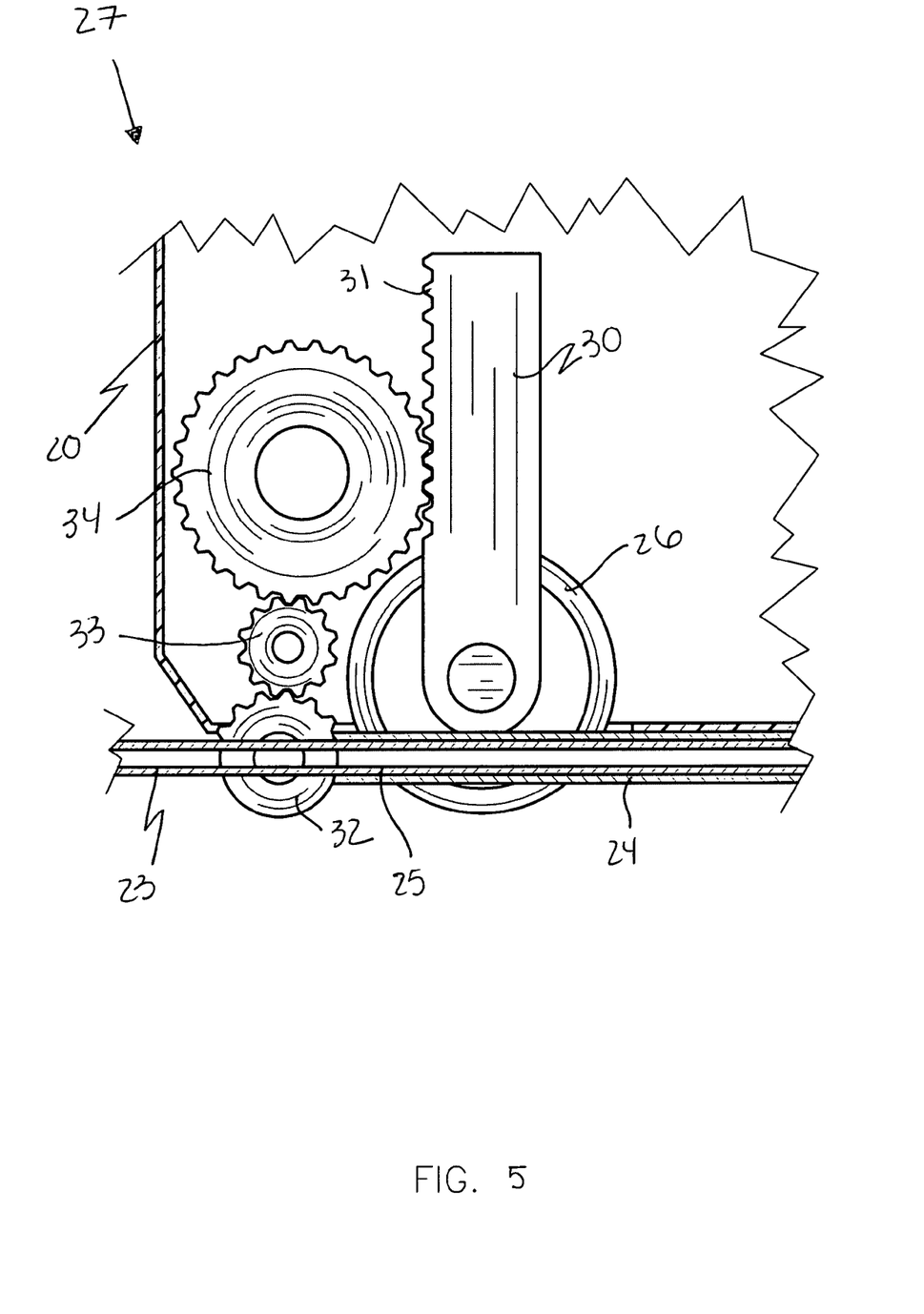
FIG. 5 is an enlarged cross sectional view showing the automatic biasing mechanism, with the caster in a retracted position and the handle adapted inward, in accordance with the present invention.
Figure 6:
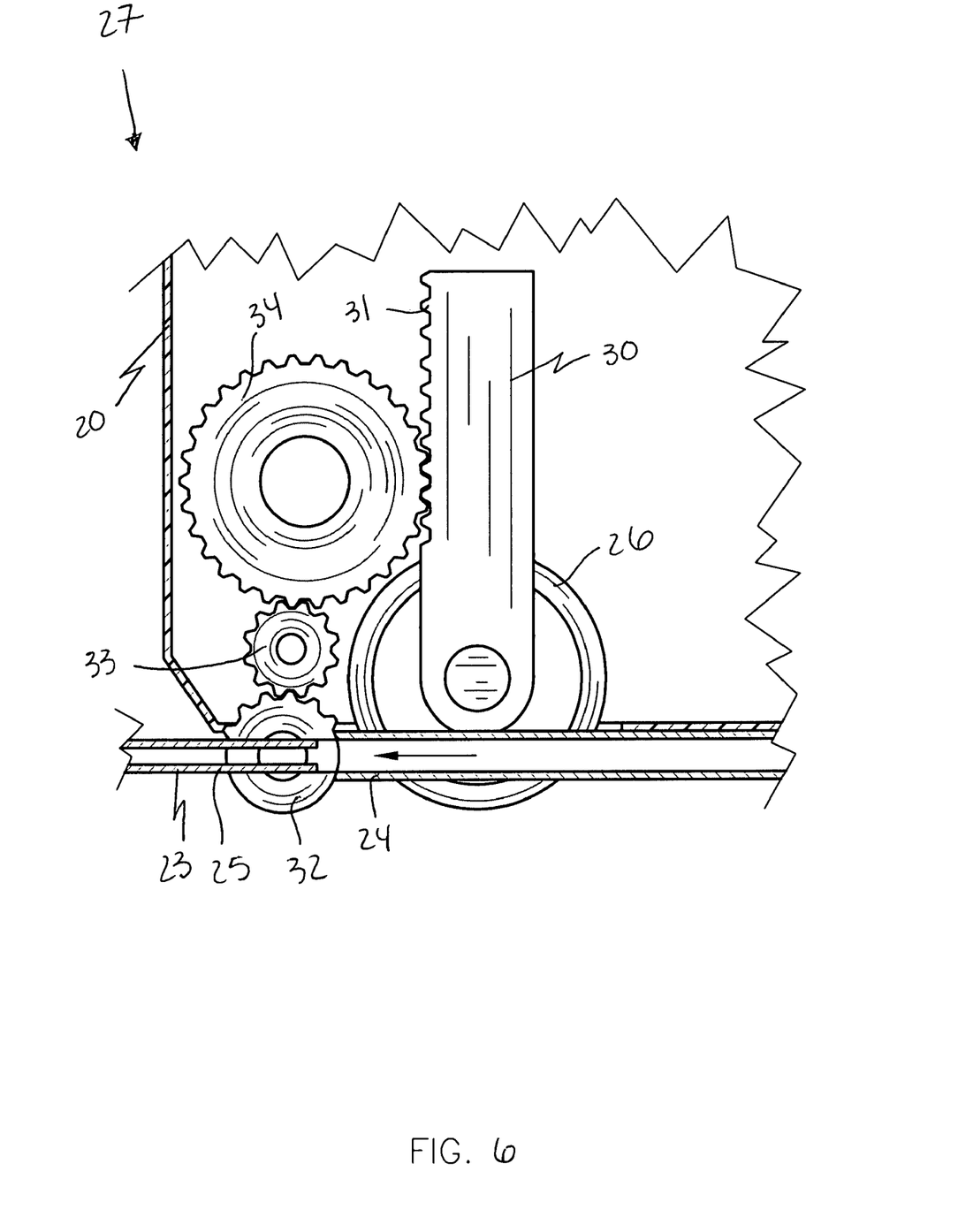
FIG. 6 is an enlarged cross sectional view showing the automatic biasing mechanism, with the caster in a retracted position and the handle adapted in an extended position, in accordance with the present invention.
Figure 7:
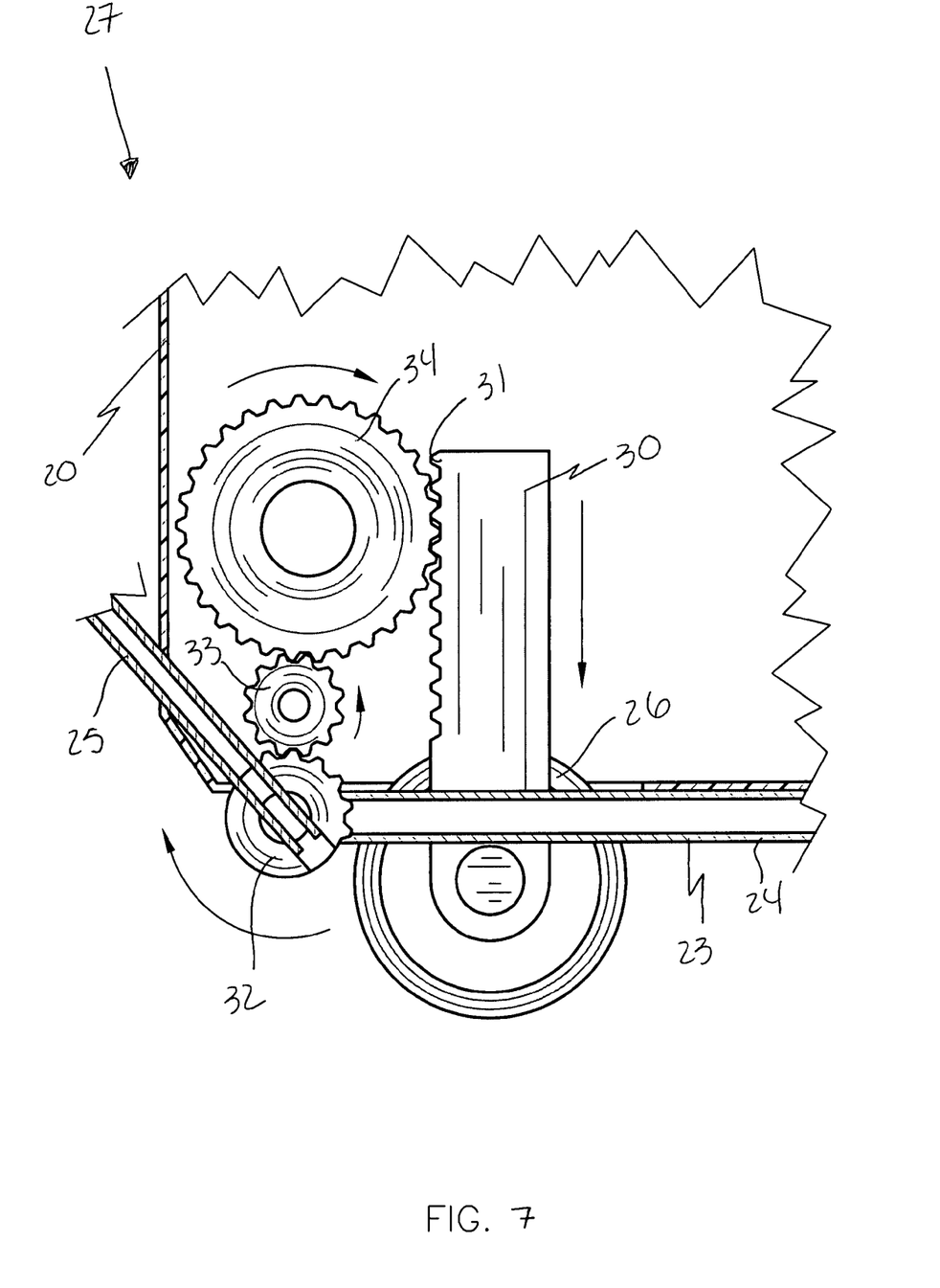
FIG. 7 is an enlarged cross sectional view showing the automatic biasing mechanism with the caster in an extended position, in accordance with the present invention.

Referring to FIGS. 5, 6 and 7, the assembly 10 further includes a plurality of casters 26 rotatably connected to the storage chamber 20, and a mechanism 27 for automatically biasing the casters 26 between exposed and retracted positions from the bottom surface 22 of the storage chamber 20 when the handle 23 is pivoted between the parallel and diagonal positions and about a curvilinear path defined adjacent to the proximal end 29 of the storage chamber 20. Such an automatic biasing mechanism 27 is partially housed within the storage chamber 20 and includes at least one rectilinear shaft 30 directly coupled, without the use of intervening elements, to at least one of the casters 26. Such a rectilinear shaft 30 has a geared front face 31 extending along a major longitudinal length thereof. The automatic biasing mechanism 27 is activated by adapting the handle 23 in a diagonal position, and thereby causes the casters 26 to be extended from the storage chamber 20.

The automatic biasing mechanism 27 further includes a drive gear 32 directly connected, without the use of intervening elements, to the handle 23 and rotated along clockwise and counter clockwise directions when the handle 23 is pivoted between the parallel and diagonal positions respectively. A first driven gear 33 is in direct and rotary engagement with such a drive gear 32, and such a first driven gear 33 is freely rotated in an opposite arcuate path with respect to the drive gear 32 and further is housed within the storage chamber 20. A second driven gear 34 is in direct and rotary engagement with the first driven gear 33 and the rectilinear shaft 30 respectively. Such a second driven gear 34 is rotated in a same direction as the drive gear 32. The second driven gear 34 causes the rectilinear shaft 30 to reciprocate along a rectilinear path while the drive gear 32 is rotated along the clockwise and counter clockwise directions when the handle 23 is pivoted between the parallel and diagonal positions respectively.

The first driven gear 33 is intermediately disposed between the second driven gear 34 and the drive gear 32, and the drive gear 32 is situated adjacent to a proximal end of the luggage cart 10 and partially exposed from the bottom surface 22 of the storage chamber 20 for allowing the male members 25 to freely rotate along a travel path defined exterior of the storage chamber 20. The first driven gear 33 is spaced from the rectilinear shaft 30 and the male members 25 respectively.

Figures 1, 2:
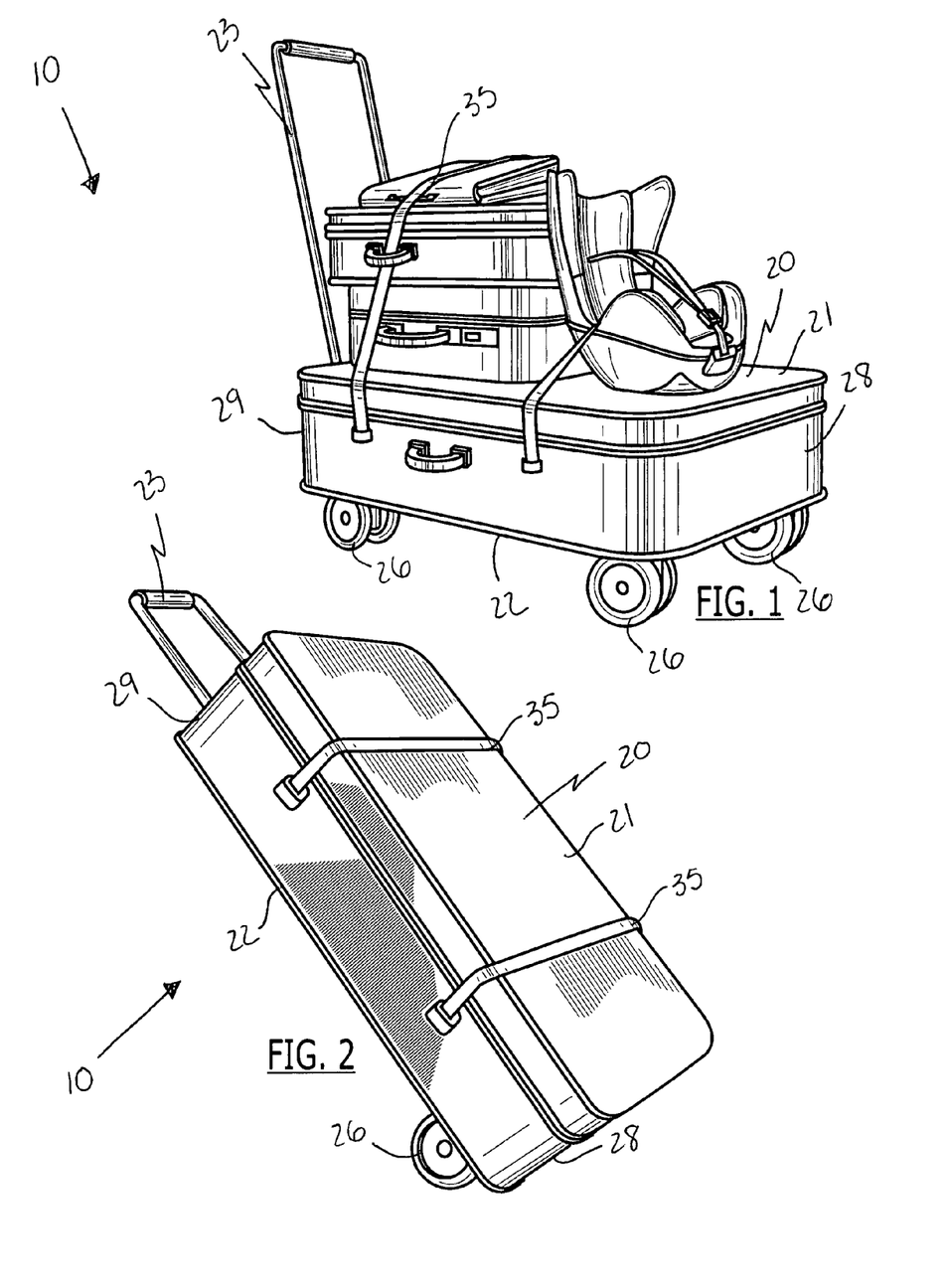
FIG. 1 is a perspective view showing an adaptable luggage cart being used as a cart, in accordance with the present invention.
FIG. 2 is a perspective view showing an adaptable luggage cart being used as a portable suitcase, in accordance with the present invention.
Figure 3:
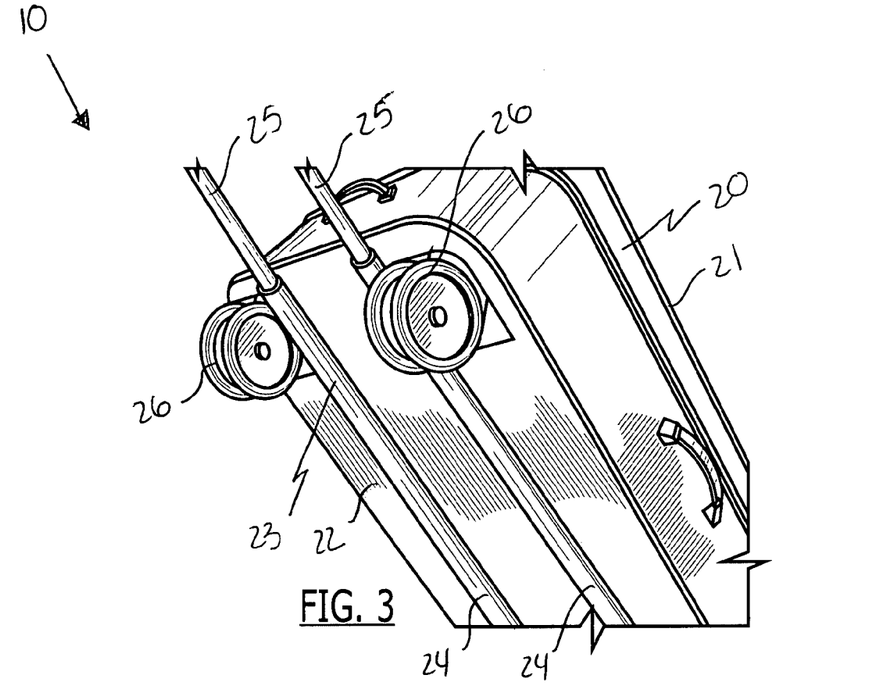
FIG. 3 is a rear perspective view of an adaptable luggage cart with the casters in an extended position, in accordance with the present invention.
Figure 4:
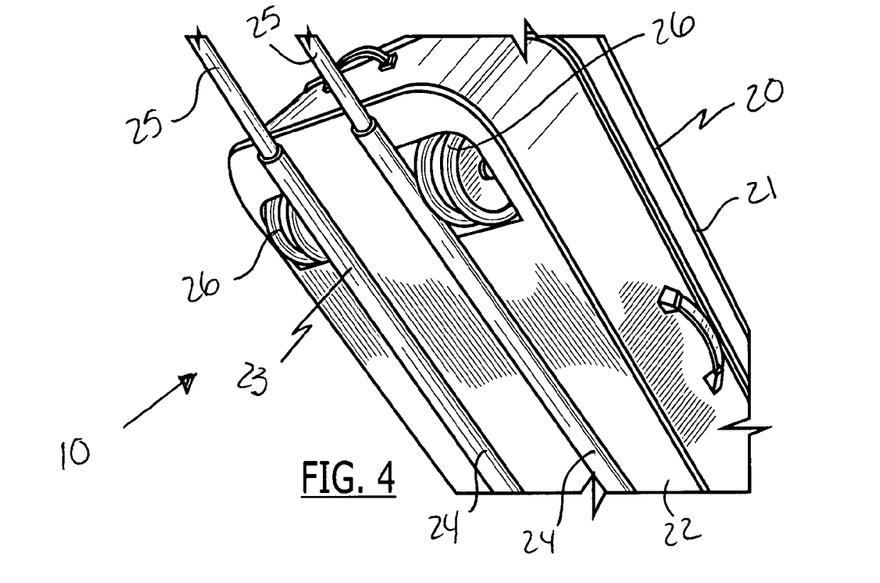
FIG. 4 is a rear perspective view showing an adaptable luggage cart with the casters in a retracted position, in accordance with the present invention.

Referring to FIGS. 1 and 2, the adaptable luggage cart 10 further includes a plurality of straps 35 with opposed ends directly mated, without the use of intervening elements, to longitudinal sides of the storage chamber 20. Such straps 35 traverse across the top surface 21 of the storage chamber 20 for securing the goods on top of the top surface 21 of the storage chamber 20. The straps 35 ensure that all luggage remains securely on the luggage cart 10 during use.

In use, the adaptable luggage cart is simple and straight forward to operate. First, the user open the suitcase, via the zipper fastener that runs the outer edge of the front flap, or in the case of a hard suitcase, by way of the locking, clasp closures. The user then packs clothing and accessories they need for their journey, placing these items neatly within the suitcase. Once the suitcase is filled with favorite clothes and accessories, the user simply closes the travel case, securing the assembly shut and they are ready to go. Should the user need to transport additional items such as an extra garment bag, shoe case, or even a child's car seat, the user simply accesses the integrated storage cart, pulling upwards on the telescoping handle to cause the cart to ascend from its position flush against the exterior of the case. Once extended, the cart is positioned directly in front of the upright suitcase, with the underside of the assembly resting on all four casters. If necessary, the user then accesses the integrated fold-down shelf, utilizing this additional storage area to hold a purse, briefcase, laptop computer, diaper bag or other small travel bags. The user then piles any additional luggage onto the front of the assembly, securing stored items via the integrated retaining straps. Pushing the assembly via the handle, the user then simply transports the suitcase and other goods across an airport, train station or from the house to the car. Upon arrival to their destination, the user quickly and easily removes any extra baggage from the front of the assembly, retracts the handle and folds the cart flush against the case. The user would then opens the suitcase, removes their clothing and accessories from the suitcase, and places them back in the suitcase for the return trip home. After use, the adaptable luggage cart assembly is easily stored along with suitcases and other travel gear, until again needed.

The assembly includes a suitcase similar in appearance to a standard suitcase. Such a suitcase is substantially rectangular-shaped and is produced in a one size standard, comparable in size to a standard, full size suitcase. The suitcase includes a durable, yet lightweight, aluminum and plastic framework, as well as heavy duty plastic components. An outer cover that is produced of soft and durable materials is stretched about the framework for forming a convenient enclosure. Of course, the outer cover may be produced from a variety of suitable materials like vinyl and leather, to name only a few, as is obvious to a person of ordinary skill in the art. The suitcase has reinforced plastic corners that are essential for allowing the soft outer cover of the assembly to maintain its rectangular shape.

The interior surface of the suitcase is accessed in a similar manner as most soft and hard suitcases and has a flap-like closure that effectively encompasses the entire front surface of the suitcase. Such a large flap is opened via a durable zipper fastener that runs about the outer edge of the front surface. Of course, the flap may be closed by way of locking clasp closures, positioned on either end of the front of the case, as is obvious to a person of ordinary skill in the art. The interior of the flap has a plurality of large and small storage compartments monolithically formed therewith, which are crucial for storing a variety of goods therein. The most notable aspect of the assembly however, is that the suitcase is easily converted into a full size travel cart. A collapsible assembly is directly attached, without the use of intervening elements, to the front end of the suitcase framework, that rests flush against the suitcase when not in use and is easily pulled forward and downward, encompassing the area in front of the suitcase when transporting goods.

The assembly includes a grated, rectangular-shaped basket that has a fold down shelf for use in conveniently storing items such as a laptop computer, purse or diaper bag. Such a collapsible framework measures the approximate length and width of the suitcase itself and is several inches in total depth. Hidden within the back of the suitcase is a "U"-shaped telescoping handle, wherein the top of the handle is positioned on the top of the suitcase. Such a telescoping handle is directly connected, without the use of intervening elements, to the suitcase framework and rests flush against the top of the suitcase when not in use. When the handle is accessed it releases the collapsible framework, effectively causing it to gently ascend to the ground. Four, heavy duty wheeled casters are appropriately positioned on the bottom surface of the cart in order to facilitate transport of the assembly. Such casters are sturdy rubber wheels that are swivel mounted, which have 360° freedom of rotation. The wheels are discreetly hidden within recessed compartments located on the exterior of the suitcase, when not in use. To secure items stored upon the cart, a pair of, heavy duty retaining straps are directly attached, without the use of intervening elements, on either side of the suitcase and are securely fastened about goods via standard buckle closures. Of course, the assembly may be produced in a variety of striking colors, as well as standard black or gray, as is obvious to a person of ordinary skill in the art.

The present invention, as claimed, provides the unexpected and unpredictable benefit of an assembly that is convenient and easy to use, is durable yet lightweight in design, is versatile in its applications, and provides users with a simple and efficient means of transporting packed goods for travel. Including a durable, four wheeled design, the present invention allows users to transport goods in an effortless and expeditious manner. As a practical alternative to handled or two-wheeled suitcases which can cause unnecessary strain and stress to the arms, neck and shoulder muscles during transport, the lightweight suitcase assembly is easily and comfortably transported. Boasting an integrated, full size transport cart, the present invention provides ample storage for use in transporting smaller travel and garment bags, purses and similar goods, as well as child care accessories such as a car seat, portable crib or similar gear, thus advantageously enabling users to transport the many goods necessary for an extended sojourn, all with one suitcase. Users appreciate that this unique assembly rests atop heavy duty wheeled casters and has an integrated handle for use in conveniently and easily maneuvering the assembly through crowded airports, train stations or city streets, with ease. By sparing the user the hassle of attempting to lug the many items necessary for travel manually, the suitcase assembly is a practical and proves an invaluable commodity for anyone who travels for business or pleasure.

In use, a method for utilizing a manually operable luggage cart to transport goods between remote locations includes the steps of: providing a central and unitary storage chamber with planar top and bottom surfaces; connecting a handle to the storage chamber in such a manner that the handle is pivotal between rectilinear and oblong displaced positions extending parallel and diagonal to a longitudinal length of the storage chamber; rotatably connecting a plurality of casters to the storage chamber; and automatically biasing the casters between exposed and retracted positions from the bottom surface of the storage chamber when the handle is pivoted between the parallel and diagonal positions and about a curvilinear path defined adjacent to the proximal end of the storage chamber.

In use, the method further includes the step of: directly mating a plurality of straps to longitudinal sides of the storage chamber by traversing the straps across the top surface of the storage chamber for securing the goods on top of the top surface of the storage chamber.

In use, the method further includes the steps of: directly coupling at least one rectilinear shaft to at least one of the casters by extending a geared front face of the rectilinear shaft along a major longitudinal length thereof; directly connecting a drive gear to the handle; rotating the drive gear along clockwise and counter clockwise directions when the handle is pivoted between the parallel and diagonal positions respectively; directly and rotatably engaging a first driven gear with the drive gear; freely rotating the first driven gear in an opposite arcuate path with respect to the drive gear; directly and rotatably engaging a second driven gear with the first driven gear and the rectilinear shaft respectively; rotating the second driven gear in a same direction as the drive gear; and the second driven gear causing the rectilinear shaft to reciprocate along a rectilinear path while the drive gear is rotated along the clockwise and counter clockwise directions when the handle is pivoted between the parallel and diagonal positions respectively.

In use, the method further includes the steps of: situating a pair of tubular female members against the bottom surface of the storage chamber by extending the female members parallel to a longitudinal length thereof; telescopically seating a pair of tubular male members within the female members by longitudinally displacing the male members between linearly extended and retracted positions respectively; completely removing the male members from the female members by fully displacing the male members to the extended position; and pivoting the male members between clockwise and counter clockwise positions such that the male members are selectively adapted between the parallel and diagonal positions as the luggage cart is raised and lowered between about a distal end of the storage chamber.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A manually operable luggage cart for transporting goods between remote locations, said luggage cart comprising:
   a central storage chamber having planar top and bottom surfaces;
   a handle being pivotal between rectilinear oblong displaced positions extending parallel and diagonal to a longitudinal length of said storage chamber;
   a plurality of casters being rotatably connected to said storage chamber; and
   means for automatically biasing said casters between exposed and retracted positions from said bottom surface of said storage chamber when said handle is pivoted between the parallel and diagonal positions and about a curvilinear path defined adjacent to a proximal end of said storage chamber;
   wherein said automatic biasing means comprises
   at least one rectilinear shaft directly coupled to at least one of said casters, said rectilinear shaft having a geared front face extending along a major longitudinal length thereof;
   a drive gear directly connected to said handle and being rotated along clockwise and counter clockwise directions when said handle is pivoted between the parallel and diagonal positions respectively;
   a first driven gear in direct and rotary engagement with said drive gear, said first driven gear being freely rotated in an opposite arcuate path with respect to said drive gear and further being housed within said storage chamber; and
   a second driven gear in direct and rotary engagement with said first driven gear and said rectilinear shaft respectively, said second driven gear being rotated in a same direction as said drive gear;
   wherein said second driven gear causes said rectilinear shaft to reciprocate along a rectilinear path while said drive gear is rotated along the clockwise and counter clockwise directions when said handle is pivoted between the parallel and diagonal positions respectively;
   wherein said handle comprises
   a pair of tubular female members situated against said bottom surface of said storage chamber and extending parallel to a longitudinal length thereof; and
   a pair of tubular male members telescopically seated within said female members and longitudinal displaced between linearly extended and retracted positions respectively;
   wherein said male members are completely removably from said female members when fully displaced to the extended position such that said male members are pivoted between clockwise and counter clockwise positions such that said male members are selectively adapted between the parallel and diagonal positions as said handle is raised and lowered about a distal end of said storage chamber;
   wherein said first driven gear is intermediately disposed between said second driven gear and said drive gear, said drive gear being situated adjacent to a proximal end of said luggage cart and partially exposed from said bottom surface of said storage chamber for allowing said male members to freely rotated along a travel path defined exterior of said storage chamber.

2. The luggage cart of claim 1, further comprising:
   a plurality of straps having opposed ends directly mated to longitudinal sides of said storage chamber, said straps traversing across said top surface of said storage chamber for securing the goods on top of said top surface of said storage chamber.

3. The luggage cart of claim 1, wherein said first driven gear is spaced from said rectilinear shaft and said male members respectively.

4. A manually operable luggage cart for transporting goods between remote locations, said luggage cart comprising:
   a central and unitary storage chamber having planar top and bottom surfaces;
   a handle being pivotal between rectilinear oblong displaced positions extending parallel and diagonal to a longitudinal length of said storage chamber;
   a plurality of casters being rotatably connected to said storage chamber; and
   means for automatically biasing said casters between exposed and retracted positions from said bottom surface of said storage chamber when said handle is pivoted between the parallel and diagonal positions and about a curvilinear path defined adjacent to a proximal end of said storage chamber, said automatic biasing means being partially housed within said storage chamber;
   wherein said automatic biasing means comprises
   at least one rectilinear shaft directly coupled to at least one of said casters, said rectilinear shaft having a geared front face extending along a major longitudinal length thereof;
   a drive gear directly connected to said handle and being rotated along clockwise and counter clockwise directions when said handle is pivoted between the parallel and diagonal positions respectively;
   a first driven gear in direct and rotary engagement with said drive gear, said first driven gear being freely rotated in an opposite arcuate path with respect to said drive gear and further being housed within said storage chamber; and
   a second driven gear in direct and rotary engagement with said first driven gear and said rectilinear shaft respectively, said second driven gear being rotated in a same direction as said drive gear;

wherein said second driven gear causes said rectilinear shaft to reciprocate along a rectilinear path while said drive gear is rotated along the clockwise and counter clockwise directions when said handle is pivoted between the parallel and diagonal positions respectively;

wherein said handle comprises a pair of tubular female members situated against said bottom surface of said storage chamber and extending parallel to a longitudinal length thereof; and a pair of tubular male members telescopically seated within said female members and longitudinal displaced between linearly extended and retracted positions respectively;

wherein said male members are completely removably from said female members when fully displaced to the extended position such that said male members are pivoted between clockwise and counter clockwise positions such that said male members are selectively adapted between the parallel and diagonal positions as said handle is raised and lowered about a distal end of said storage chamber;

wherein said first driven gear is intermediately disposed between said second driven gear and said drive gear, said drive gear being situated adjacent to a proximal end of said luggage cart and partially exposed from said bottom surface of said storage chamber for allowing said male members to freely rotated along a travel path defined exterior of said storage chamber.

5. The luggage cart of claim 4, further comprising:

a plurality of straps having opposed ends directly mated to longitudinal sides of said storage chamber, said straps traversing across said top surface of said storage chamber for securing the goods on top of said top surface of said storage chamber.

6. The luggage cart of claim 4, wherein said first driven gear is spaced from said rectilinear shaft and said male members respectively.

* * * * *